United States Patent
Magee

(10) Patent No.: US 11,678,681 B2
(45) Date of Patent: Jun. 20, 2023

(54) OSMOTIC SYSTEM FOR MAINTENANCE OF PERISHABLE ITEMS

(71) Applicant: Florida A&M University, Tallahassee, FL (US)

(72) Inventor: Charles Magee, Cairo, GA (US)

(73) Assignee: Florida A&M University, Tallahassee, FL (US)

( * ) Notice: Subject to any disclaimer, the term of this patent is extended or adjusted under 35 U.S.C. 154(b) by 35 days.

(21) Appl. No.: 17/529,477

(22) Filed: Nov. 18, 2021

(65) Prior Publication Data
US 2022/0071240 A1 Mar. 10, 2022

Related U.S. Application Data

(62) Division of application No. 16/521,809, filed on Jul. 25, 2019, now Pat. No. 11,206,854.

(60) Provisional application No. 62/702,965, filed on Jul. 25, 2018.

(51) Int. Cl.
| | | |
|---|---|---|
| A23L 3/3454 | (2006.01) | |
| A23L 3/00 | (2006.01) | |
| A23L 3/3589 | (2006.01) | |
| A23L 5/00 | (2016.01) | |
| A23B 7/153 | (2006.01) | |
| A23B 4/30 | (2006.01) | |

(Continued)

(52) U.S. Cl.
CPC .............. *A23L 3/001* (2013.01); *A23B 4/30* (2013.01); *A23B 7/153* (2013.01); *A23L 3/3454* (2013.01); *A23L 3/3589* (2013.01); *A23L 5/55* (2016.08); *A23B 4/18* (2013.01); *B05D 1/02* (2013.01)

(58) Field of Classification Search
CPC .... A23L 3/3454; A23L 3/3589; A23L 3/3463; A23L 5/55; A23B 7/022; A23B 7/02; A23B 7/153; A23B 7/158; A23B 4/18; A23B 4/30; A23B 5/20; B05D 1/02
USPC .......................................... 99/473, 487, 536
See application file for complete search history.

(56) References Cited

U.S. PATENT DOCUMENTS

| | | | | |
|---|---|---|---|---|
| 5,855,941 A | * | 1/1999 | Allaf ........................ | A23B 7/02 426/312 |
| 2001/0031301 A1 | * | 10/2001 | Aichele ..................... | A23L 5/55 99/533 |

(Continued)

*Primary Examiner* — Reginald Alexander
(74) *Attorney, Agent, or Firm* — Michele L. Lawson; Smith & Hopen, P.A.

(57) ABSTRACT

A system and methodology for rehydrating perishable items (e.g., flowers, fresh food items, such as fruits, vegetables, other produce, and nuts) during storage and transportation thereof. The osmotic rehydration apparatus includes a pressurized chamber, a humidifier, an ozone generator, an electrostatic sprayer, a reservoir containing saline, and an air compressor. The perishable items are placed in the osmotic chamber under positive pressure. A film of saline solution is applied to the surface of the perishable items via an electrostatic sprayer. The saline/chlorine film on the perishable items is dried, and the osmotic chamber is saturated with ozone gas via an ozone generator. The osmotic chamber is then saturated with tiny pure water droplets via a humidifier or an electrostatic sprayer. The pressure within the chamber is raised to a pressure above atmospheric pressure. The osmotic chamber is then placed inside a cooler at a temperature slightly above freezing.

7 Claims, 4 Drawing Sheets

(51) Int. Cl.
  *B05D 1/02* (2006.01)
  *A23B 4/18* (2006.01)

(56) References Cited

U.S. PATENT DOCUMENTS

2010/0028510 A1* 2/2010 Ditzler .................. A23B 9/26
                                                    426/331
2017/0013849 A1* 1/2017 Thippareddi .......... A23B 5/015

* cited by examiner

OSMOTIC SYSTEM FOR MAINTENANCE OF PERISHABLE ITEMS

CROSS-REFERENCE TO RELATED APPLICATIONS

This application is a divisional of and claims priority to currently pending Nonprovisional application Ser. No. 16/521,809, entitled "Osmotic System for Maintenance of Perishable Items", filed Jul. 25, 2019, which is a nonprovisional of and claims priority to provisional application No. 62/702,965, entitled "Osmotic System for Maintenance of Perishable Items," filed Jul. 25, 2018 by the same inventor, the entirety of each of which is incorporated by reference.

BACKGROUND OF THE INVENTION

1. Field of the Invention

This invention relates, generally, to the maintenance of perishable items. More specifically, it relates to osmotic systems that aid in the rehydration, disinfection, sanitation, storage, and shipping of perishable items, such as fruits, vegetables, nuts, and flowers.

2. Brief Description of the Prior Art

Farmers, supermarkets, shippers, storage facilities, and other handlers and vendors of fruits, vegetables, nuts, and cut flowers are in need of a low cost, efficient, device, process, and system to ensure that their fruits, vegetables, nuts, and cut flowers are safe and free of bacteria, pathogens, insects, worms, and other contaminants. Loss of produce due to dehydration and wilting is a major problem in the food and agricultural industries. Farmers and other vendors who sell their fruits, vegetables, nuts, and cut flowers at roadside stands and farmers' markets can lose up to 50% of their produce and flowers due to dehydration and wilting. Most of the lost produce and flowers can be salvaged by rehydration and/or slowing down the dehydration and wilting process. Further, farmers, supermarkets, shippers, and other handlers and vendors of fruits, vegetables, nuts, and cut flowers need a better process and system that can enhance the storage and shipping life of the produce or flowers until they are sold or consumed.

Accordingly, what is needed is a device and system through which perishable goods can be rehydrated to slow the dehydration and wilting process in the goods. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicant in no way disclaims these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for a rehydration and sanitation system used to improve the health of perishable is now met by a new, useful, and nonobvious invention.

The novel system includes an osmotic rehydration system for storing and transporting perishable items. The osmotic rehydration system includes an osmotic rehydration device having a body that defines an internal chamber disposed to receive one or more perishable items therein. The body includes a plurality of exterior surfaces with at least one of the plurality of exterior surfaces including an air compressor, a fluid sprayer, and a humidifier. The air compressor is in fluidic communication with the chamber and pumps pressure into the chamber to pressurize the chamber, such that a high-pressure environment is created within the chamber. The fluid sprayer is in communication with a reservoir that is configured to contain a solution therein. The fluid sprayer includes a terminal end at least partially disposed within the chamber, where the fluid sprayer atomizes and disperses an amount of the solution into the chamber. The humidifier is in fluidic communication with the chamber, where the humidifier supplies water vapor to the chamber, such that the relative humidity of the chamber is maintained at a predetermined amount. The humidifier is used in combination with the high-pressure supplied by the air compressor such that the rehydration of the perishable items is accomplished by osmosis such that the water vapor is drawn into the pores of the perishable items.

The novel method of rehydrating perishable items during storage is provided in which the perishable items are pre-cooled to remove the field heat. The perishable items are washed with chlorinated water to kill an amount of living contaminants. The perishable items are placed inside an osmotic chamber. A film of a solution is applied to a surface of the perishable items and air-dried. The solution is configured to kill an amount of living contaminants disposed on the surface of the perishable items. The osmotic chamber is then saturated with water droplets via a humidifier and the pressure inside the chamber is increased to a level above atmospheric pressure to create a positive pressure within the chamber. Molecules of the solution are drawn into the pores of the perishable items due to the positive pressure within the chamber and an osmotic potential of the film. The increased pressure and a presence of the solution within the pores of the perishable items causes the water droplets on the surface of the perishable items to be drawn into the pores of the perishable items. The osmotic pressure chamber is positioned within a cooler at a temperature slightly higher than freezing, thereby slowing the respiration process of the perishable items during storage in the cooler. During storage, chlorine gas from the chlorinated water used to wash the perishable items breaks down and off-gases during storage and the positive pressure and increased relative humidity environment prevents dehydration of the perishable items during storage.

Objects of the invention include rehydrating dehydrated or wilted perishable items; disinfecting and sanitizing perishable items; prolonging the shipping and storage life of perishable items; permitting the transport of perishable items in unrefrigerated vehicles; slowing down or stop water loss from perishable items (due to respiration and evapotranspiration) while in transport or storage; providing a more effective mechanism of using ozone gas and electrostatic voltage to combat harmful organisms (e.g., *E. coli, Salmonella, Listeria*, insects, and worms) in perishable items; reducing the number of foodborne disease outbreaks from perishable items that have become contaminated; and provide a portable rehydration and sanitation chamber.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

The present invention includes a rehydration and sanitation device for use in combination with perishable items, such as flowers, fruit, vegetables, nuts, other produce, and other fresh food items. In plant cells, for example, wilting occurs when the direction of water flow is oriented out of the plant cells, resulting in exosmosis (as opposed to osmosis, during which water flows into the plant cells). When plant cells are full of water, the cells are turgid and under positive pressure; however, when plant cells lose water, the turgor potentials in the cells decreases and the pressure becomes negative, leading to relatively flaccid cells. Cells that are flaccid may be said to be dehydrated due to the loss of water associated therewith, and such dehydration can lead to the death of the cells.

Accordingly, the rehydration device includes a plurality of components designed to rehydrate and sanitize perishable items stored within the device through osmosis. As used herein, "rehydration" refers to a method of restoring perishable items, such as produce or flowers, to their original moisture content, firmness, and appearance. The present invention includes the rehydration of perishable items by wetting the items with a saline solution within a pressurized chamber, followed by subjecting the items to fresh water. The goods are also subjected to a high-pressure environment within the pressurized chamber to facilitate osmosis of water into the pores of the perishable items, thereby rehydrating the items.

Figure 1A:
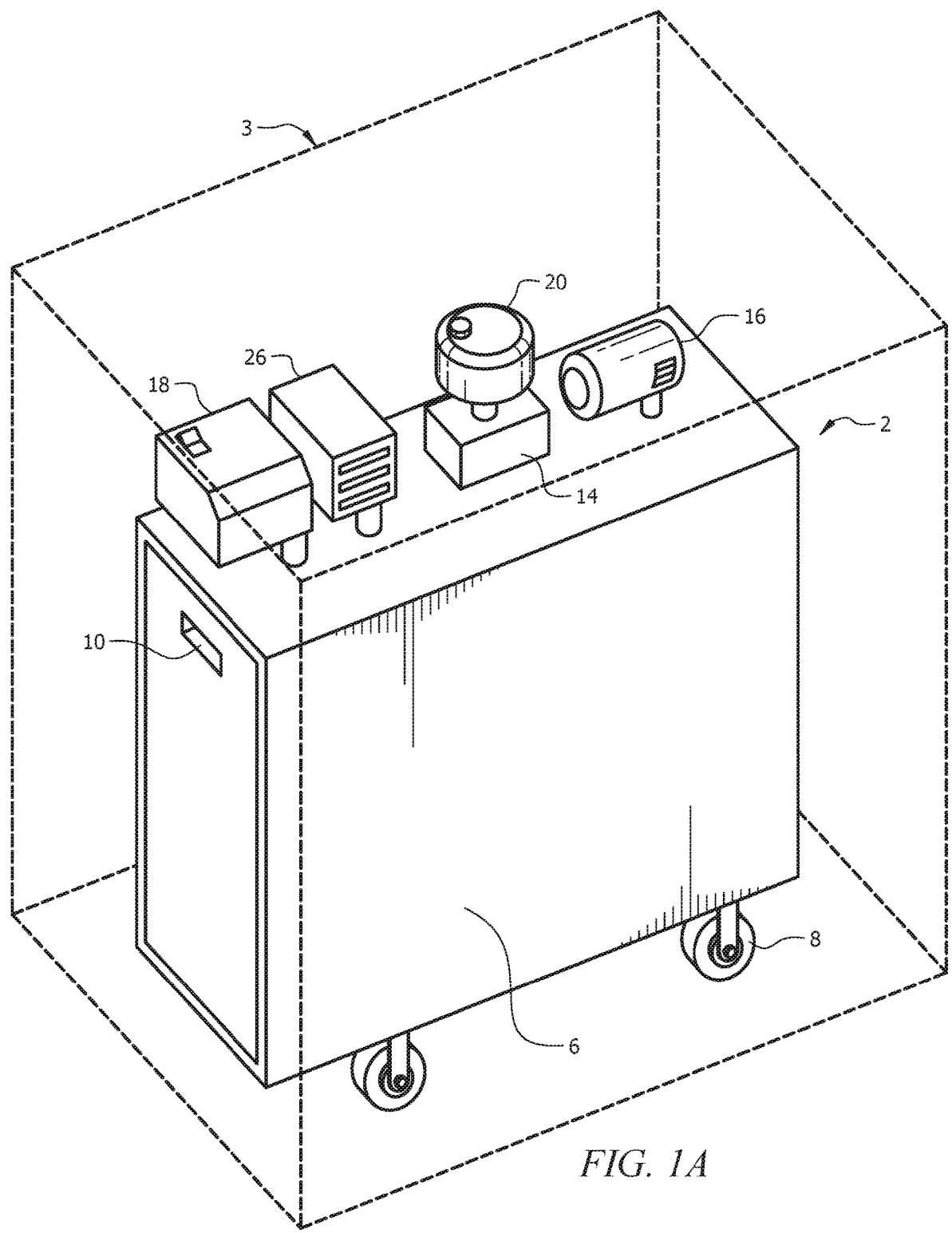
FIG. 1A is a perspective view of an osmotic rehydration system, in accordance with an embodiment of the present invention.
Figure 1B:
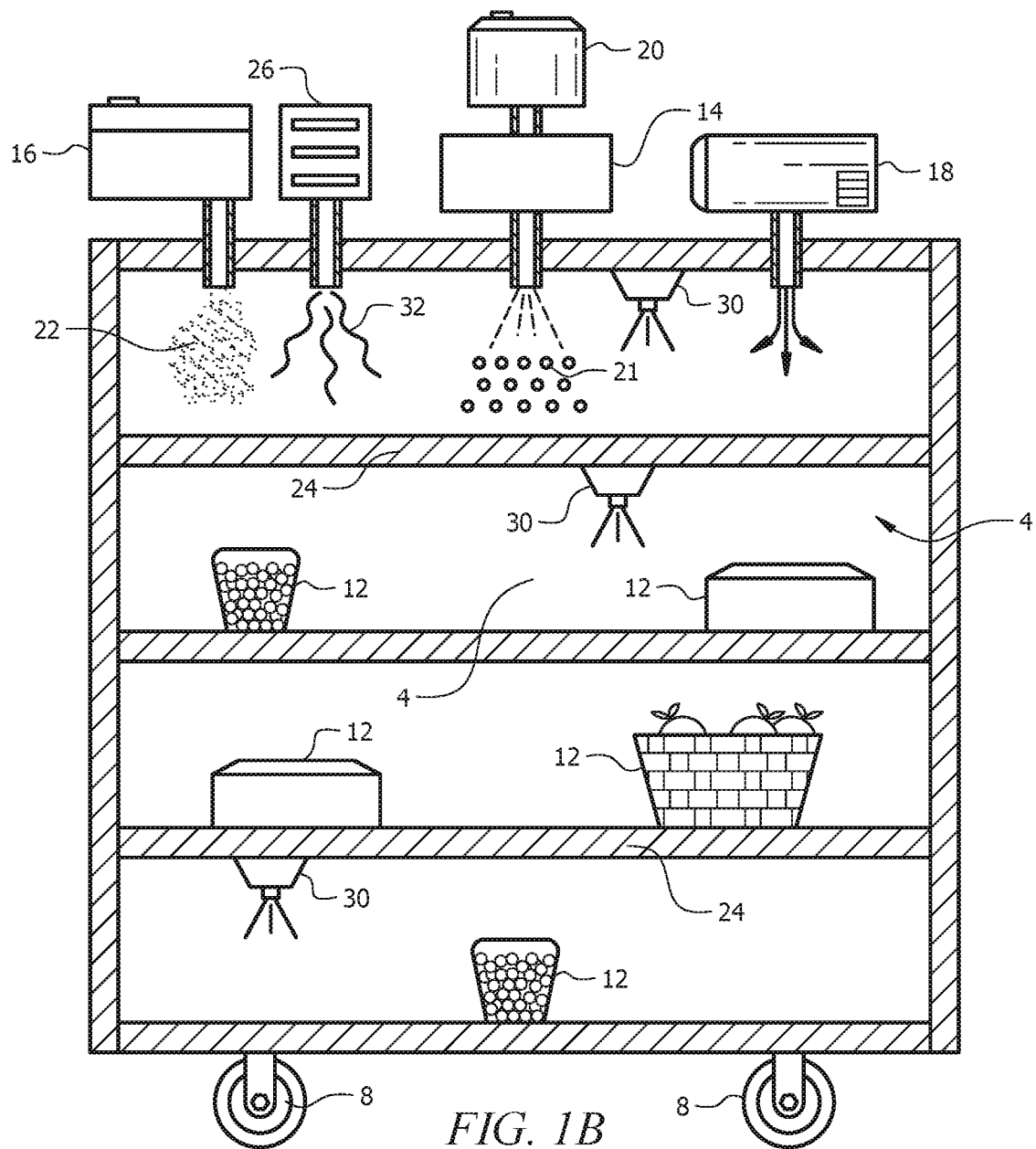
FIG. 1B is an interior view of the osmotic rehydration system of FIG. 1A.
Figure 1C:
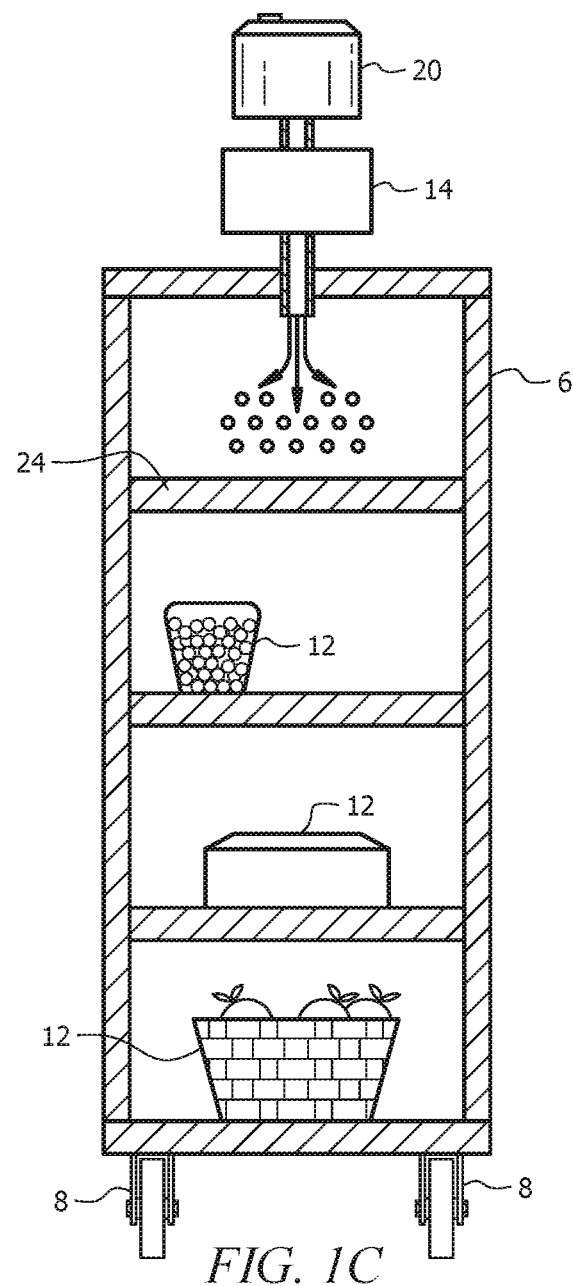
FIG. 1C is a side orthogonal view of the osmotic rehydration system of FIG. 1A.
Figure 2:
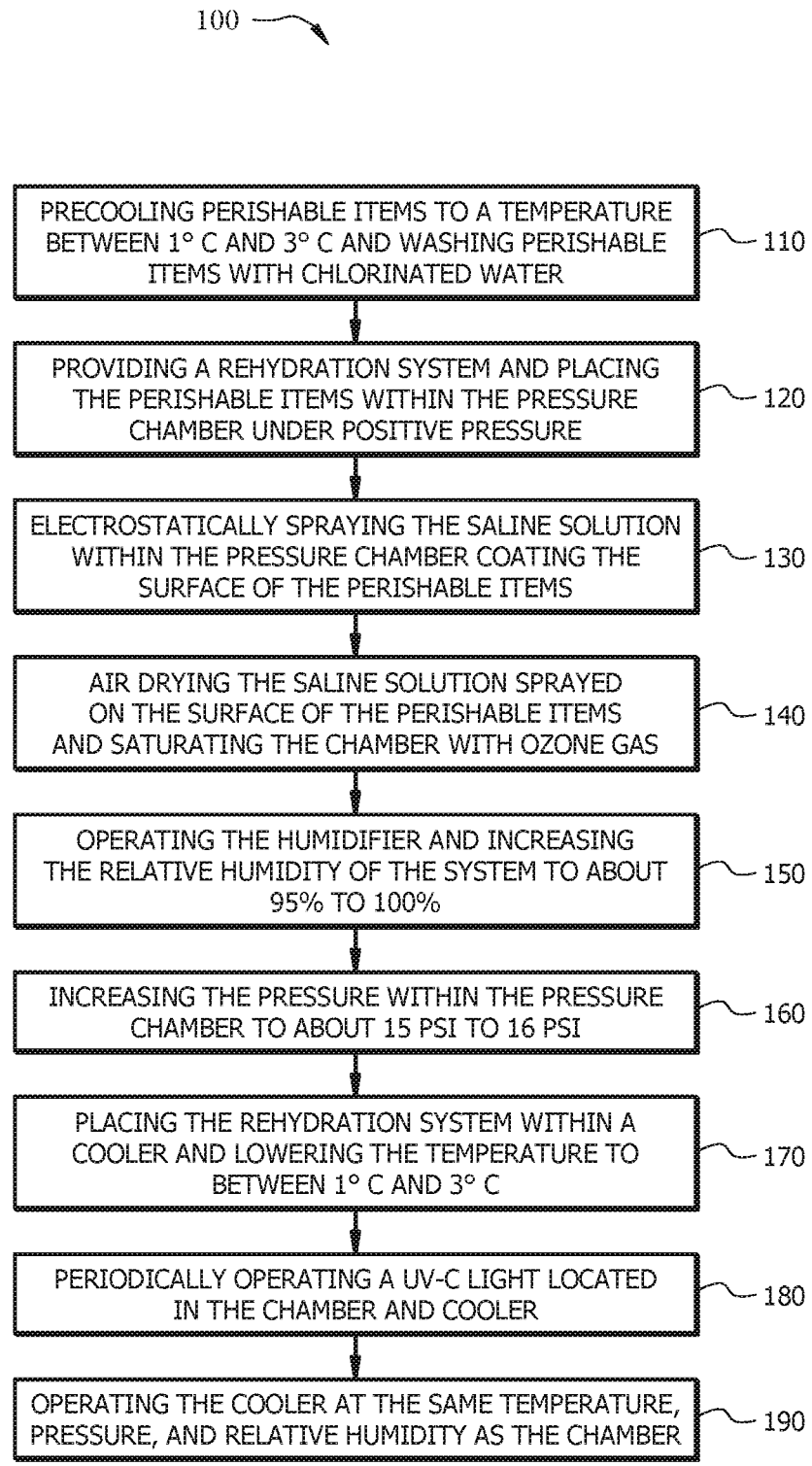
FIG. 2 is a process flow diagram depicting a method of rehydrating perishable items during storage and transportation, in accordance with an embodiment of the present invention.

As shown in FIGS. 1A-1C, rehydration system 2 includes body 6 and door 10 that is hingedly coupled to body 6. Body 6 serves as an exterior surface for rehydration system 2 and defines pressurized chamber 4 that is an interior chamber of body 6. Door 10 provides access to pressurized chamber 4. In addition, one or more wheels 8 may be disposed on at least one surface of body 6, external to pressurized chamber 4, such that rehydration system 2 can be easily transported via wheels 8. Pressurized chamber 4 is disposed to receive one or more perishable items 12 therein, which, as discussed above, may be flowers, fruit, vegetables, nuts, other produce, and other fresh food items.

During storage, perishable items 12 undergo the common metabolic reactions associated with cellular respiration, including the conversion of glucose into energy. While the respiration process is integral to the life of perishable items 12, the chemical reaction of converting glucose into energy generates heat which causes an acceleration in the dehydration process. As such, in an embodiment of the present invention, perishable items 12 are cooled to slow the rate of dehydration. As shown in FIG. 1A, rehydration system 2 is disposed within cooler 3, which is a cooled chamber that is larger in volume than rehydration system 2. Cooler 3 may be a walk-in refrigerator or freezer, refrigerated truck, or other refrigeration system that is capable of received rehydration system 2 therein.

As shown in particular in FIG. 1B, pressurized chamber 4 is defined by body 6 with chamber 4 being an interior compartment of body 6. Pressurized chamber 4 includes one or more shelves 24 disposed therein, with shelves 24 being disposed to receive an amount of perishable items 12 thereon. Shelves 24 may include one or more of hooks, clips, clamps, straps, and other devices designed to secure perishable items 12 in place, particularly during storage and transportation. Shelves 24 may be removable and replacement from within chamber 4, such that chamber 4 accommodates larger perishable items 12 therein.

Rehydration system 2 includes a plurality of components that are in fluidic communication with chamber 4, each of which is designed to rehydrate, sanitize, or otherwise improve a health of perishable items 12. These components include air compressor 16, fluid sprayer 14 in communication with reservoir 20, ozone generator 26, and humidifier 18. As shown in FIG. 1A in particularly, each of these components may be disposed on an exterior surface of body 6 of rehydration system 2; however, it should be appreciated that one or more of the components may be disposed within chamber 4 disposed within body 6. Each of the components will be discussed herein below.

As noted above, rehydration system 2 includes air compressor 16 in fluidic communication with chamber 4. Air compressor 16 pumps pressure into chamber 4 to create a high-pressure environment within chamber 4. In an embodiment, air compressor 16 is configured to increase a pressure within chamber 4 to approximately 15-30 pounds per square inch (psi), depending on the type of perishable items 12 disposed within chamber 4. The various functions of air compressor 16 will be discussed in more detail in the sections below, which outline the methods of rehydrating perishable items 12.

Rehydration system 2 also includes fluid sprayer 14 that is coupled to reservoir 20. Reservoir 20 is configured to house an amount of solution 21 therein, which may be fresh water or a saline solution having a concentration of, for example, approximately 0.9%±10% sodium chloride (NaCl). It is appreciated that varying concentrations of saline may be used in rehydration system 2, such that the chemical potential of fluid within chamber 4 is lower than the chemical potential of the saline solution. Sprayer 14 disperses an amount of solution 21 into chamber 4, while simultaneously atomizing solution 21 during the dispersal process. By atomizing solution 21, sprayer 14 alters solution 21 to create molecules having a smaller diameter than a diameter of pores within the cell walls of perishable items 12. As such, sprayer 14 provides for solution 21, such as a saline solution, to diffuse through the cell walls of perishable items 12.

In an embodiment, sprayer 14 is an electrostatic sprayer that imparts an electrostatic charge on solution 21 exiting a nozzle of sprayer 14. By imparting a voltage on solution 21, the solution dispersed by electrostatic sprayer 14 kills living contaminants, such as worms, insects, and/or bacteria that may reside on the surface of perishable items 12. In use, the electrostatic charge on solution 21 draws the atomized saline or water droplets of solution 21 toward perishable items 12 with a force that is of greater magnitude than gravitational forces, such that droplets of solution 21 can change direction and move against gravity to coat all surfaces of perishable items 12 due to the electrostatic attraction between solution 21 and perishable items 12. This movement may be referred to as a "wrap-around" effect, which causes droplets of solution 21 to efficiently cling to surfaces of perishable items 12, rather than inefficiently passing by the surfaces of perishable items 12 without adequately coating perishable items 12.

An embodiment of rehydration system 2 includes ozone generator 26 in fluidic communication with chamber 4. Ozone generator 26 supplies ozone gas 32 into chamber 4, and is designed to kill bacteria and pathogens on the surface of perishable items 12. As such, in combination with sprayer 14, which is also designed to kill living contaminants within chamber 4, ozone generator 26 disinfects and sanitizes perishable items 12 within chamber 4.

Rehydration system 2 further includes humidifier 18 that is in fluidic communication with chamber 4. Humidifier 18 supplies water vapor 22 to chamber 4, and maintains a relative humidity of between 95% and 100% inside chamber 4 during operation. In an embodiment, the humidity within chamber 4 may range from 90% relative humidity to 100% relative humidity, and may further be supplied by a fogger or any other means known in the art to maintain the desired relative humidity levels within chamber 4. When humidifier 18 is used in combination with the high pressure supplied by air compressor 16, rehydration of perishable items 12 is accomplished by osmosis by water vapor 22 being drawn into the pores of perishable items 12.

In an embodiment, one or more ultraviolet (UV) lights 30, such as a short-wavelength ultraviolet (or UV-C) light, may be disposed within chamber 4. UV lights 30 can further sanitize or otherwise disinfect perishable items 12 by killing microorganisms on the surface of the items, such as by penetrating the cellular walls of the microorganisms and destroying nucleic acid and DNA thereof.

Referring now to FIG. 2, in conjunction with FIGS. 1A-1C, an exemplary process flow diagram is provided, depicting a method for the rehydration of perishable items 12 during storage and transportation. The steps delineated in the exemplary process flow diagram of FIG. 2 are merely exemplary of a preferred order for the rehydration. The steps may be carried out in another order, with or without additional steps included therein. Additionally, the steps may be carried out with an alternative embodiment of the rehydration system as contemplated in the above description.

The method for the rehydration of perishable items 12 during storage and transportation begins at step 110, during which fresh perishable items 12 are pre-cooled to remove the field heat associated with the items. Precooling and washing perishable items 12 may take place at the same time, and chlorinated water may be used to sanitize perishable items 12 by reducing the amount of bacteria in contact with perishable items 12. The chlorine gas associated with the chlorinated water is removed in the steps below. During step 110, perishable items 12 are cooled to a temperature of about 1° C. and 3° C. with chamber 4 having a relative humidity of about 95% to 100%. In an embodiment, chamber 4 is precooled to a temperature of about 0.1° C. to about 10° C. with a humidity of about 60% to 100%; however, one of ordinary skill in the art would appreciate that the temperature and humidity ranges may vary depending on the specific perishable items 12 placed in chamber 4. In an embodiment, precooling is not required such as for storage for shorter amounts of time.

After disinfecting perishable items 12 with the chlorinated water in step 110, perishable items 12 are rinsed clean with a combination of saline solution 21 and aqueous ozone to remove any dead microbes killed by the chlorine and ozone. Some microorganisms, such as *E. coli* and *Giardia*, may build up resistance to chlorine over time. By rinsing perishable items 12, the bio-films of dead microbes killed by the chlorine are removed from the surface of perishable items 12. In an embodiment, if perishable items 12 are not dehydrated or wilted, perishable items 12 may be placed directly in cooler 3 for short term storage of about 7 to 10 days.

The method proceeds to step 120, during which perishable items 12 are placed in chamber 4 under positive pressure. A film of saline solution 21 is applied to the surface of perishable items 12 via electrostatic sprayer 14, as shown in step 130. In an embodiment, the film may be applied using a hand-held sprayer, mechanical sprayer, or any other means of atomizing the solution to apply to the surface of perishable items 12. Molecules of the saline solution 21 and chloride water rinse solution are drawn into the pores of perishable items 12 due to the positive air pressure, as well as the osmotic potential of the surface film. The saline solution 21 and chlorine wash kills any bacteria or pathogens in or on the surface of perishable items 12, and the electrostatic charge kills any insects or worms in or on the surface of perishable items 12.

The saline/chlorine film on perishable items 12 is air-dried during step 140, and the osmotic chamber 4 is saturated with ozone gas 32 via ozone generator 26. The film may be air-dried to prevent fluid 21 from dripping off perishable items 12 within chamber 4. The air compressor 16 facilitates the air-drying process preventing some or all of the exosmosis process from beginning, preventing the flow out water out of perishable items 12. Pressure chamber 4 is then saturated with tiny pure water droplets 22 via humidifier 18 or electrostatic sprayer 14 during step 150. Next, during step 160, the pressure within chamber 4 is raised to a pressure greater than atmospheric pressure. The positive pressure, along with saline solution 21 within the pores of perishable items 12, causes water droplets 22 on the surface of perishable items 12 to be drawn into the surface pores.

This is an osmotic process, and the hydrostatic pressure increases in the cells of perishable items 12 and keeps the cells in a turgid state.

During step 170, pressure chamber 4 is placed inside cooler 3 at a temperature slightly above freezing. The cold temperature slows the rate of respiration of perishable items 12 during storage. During storage, any chlorine gas located within the cells of perishable items 12 as a result of washing perishable items 12 with chlorinated water is off-gassed into an environment surrounding perishable items 12. The positive pressure and the high relative humidity environment prevent the dehydration of perishable items 12 during long periods of storage. During step 180, UV lights 30 located within the chamber and cooler 3 are periodically operated to kill harmful microorganisms, thereby increasing the long- and short-term storage times. The duration and intensity of the UV light depend on the time various perishable items 12 remain within chamber 4. Additionally, UV light 30 enhances ozone gas production within chamber 4 and cooler 3.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of rehydrating perishable items during storage and transportation thereof, comprising:

pre-cooling the perishable items to remove a field heat;

washing the perishable items with chlorinated water to kill an amount of living contaminants;

placing the perishable items in an osmotic chamber;

applying a film of solution to a surface of the perishable items via a fluid sprayer, the solution configured to kill an amount of living contaminants disposed on the surface of the perishable items;

air-drying the solution residing on the perishable items via an air compressor;

saturating the osmotic chamber with water droplets via a humidifier;

increasing, via the air compressor, a pressure within the osmotic chamber to a level above atmospheric pressure to create a positive pressure within the chamber, wherein:

molecules of the solution are drawn into pores of the perishable items due to the positive pressure within the chamber and an osmotic potential of the film; and the increased pressure and a presence of the solution within the pores of the perishable items causes the water droplets on the surface of the perishable items to be drawn into the pores of the perishable items; and positioning the osmotic chamber within a cooler at a temperature slightly higher than freezing, thereby slowing a respiration process of the perishable items during storage in the cooler, wherein:

chlorine gas from the chlorinated water used to wash the perishable items breaks down and off-gases during storage, and the positive pressure and increased relative humidity environment prevents dehydration of the perishable items during storage.

2. The method of rehydrating perishable items of claim 1, wherein the pressure within the osmotic chamber is increased to a level that is between 15 psi and 16 psi.

3. The method of rehydrating perishable items of claim 1, wherein the solution is a saline solution.

4. The method of rehydrating perishable items of claim 3, wherein the saline solution has a concentration of 0.9% NaCl.

5. The method of rehydrating perishable items of claim 1, wherein the relative humidity of the osmotic chamber is between 95% and 100%.

6. The method of rehydrating perishable items of claim 1, wherein the fluid sprayer is an electrostatic sprayer that imparts an electrostatic charge on the solution exiting the terminal end of the fluid sprayer, such that the electrostatic charge kills an amount of the living contaminants residing on a surface of the perishable items.

7. The method of rehydrating perishable items of claim 1, further comprising saturating the osmotic chamber with ozone gas via an ozone generator, such that the ozone gas kills an amount of the living contaminants residing on the perishable items.

* * * * *